Patented Oct. 11, 1927.

1,645,180

UNITED STATES PATENT OFFICE.

COURTNEY CONOVER, OF ST. LOUIS, MISSOURI, ASSIGNOR TO MONSANTO CHEMICAL WORKS, OF ST. LOUIS, MISSOURI, A CORPORATION OF MISSOURI.

PROCESS FOR PRODUCING BENZOIC ACID FROM PHTHALIC ANHYDRIDE.

No Drawing.   Application filed December 21, 1925.  Serial No. 76,897.

This invention relates to the manufacture of benzoic acid.

One object of the invention is to provide a continuous process for producing benzoic acid from the anhydride of ortho-phthalic acid.

Another object is to provide a practicable process for producing benzoic acid that is free from the chlorine compounds usually present in benzoic acid produced by conventional processes.

And still another object of my invention is to provide a process by which anhydride of ortho-phthalic acid can be converted into benzoic acid in a single operation and at ordinary pressures.

To this end I have devised a process for producing benzoic acid, which, briefly stated, consists in subjecting a mixture of phthalic anhydride vapor and water vapor to the action of a catalytic agent, while said mixture is maintained at a temperature which will prevent the precipitation of phthalic acid. This reaction produces benzoic acid and carbon-dioxide, and under favorable conditions, more than 90% of the phthalic anhydride attacked can be converted into benzoic acid.

The catalytic mass that is used may consist of various catalysts or a mixture of one or more suitable catalysts with an inert material, but I have found that excellent results can be obtained with compounds of copper, zinc, or aluminum, or mixtures of the same, such, for example, as oxides or salts formed by weak mineral acids which at temperatures up to 600° C. are infusible and not appreciably volatile, and which, moreover, are stable at such temperatures under ordinary pressure and in the presence of water vapor, except that the state of oxidation may change with change of conditions to which they are subjected. The form in which the catalyst is used is not of prime importance, but good results can be obtained with zinc oxide, copper oxide or aluminum oxide in the form of a coating on granules of an inert or mildly active material, such as quartz, fused quartz, flint or infusorial earth.

One convenient way of practising my process is to mix the vapor of phthalic anhydride with steam superheated to about 200° C. in the proportion of one part by weight of phthalic anhydride to about 50 parts of steam and then introduce said mixture of vapors into a reaction chamber that contains a suitable catalyst, preferably zinc oxide, so as to cause said mixture to be acted upon by the catalyst. Before said mixture of vapors is brought into contact with the catalyst it is maintained at a temperature above 200° C., so as to prevent precipitation of phthalic acid, and while it is in the reaction chamber it is kept under pressure only sufficient to cause it to flow through said chamber at the desired rate and to remain in contact with the catalyst until all but about 10% of the phthalic anhydride has been attacked, the reaction chamber being preferably maintained throughout most of its volume at a temperature of about 450° C. After the mixture has been subjected to the above treatment in the reaction chamber it is then passed into a suitable condenser.

The apparatus that is used to practise or carry out my process may be of the form commonly used for carrying out endothermic catalytic reactions in the gas phase. Various changes can be made with respect to the proportion of phthalic anhydride vapor and steam, with respect to the temperature of the reaction chamber and with respect to the time of contact between the vapors and the catalyst. To obtain the best yields the proportion of steam in the vaporous mixture should be greatly in excess of that theoretically required for the reaction. A proportion of steam greater than 10 parts by weight to one part of phthalic anhydride is advisable under most conditions of temperature and time of contact. At temperatures as low as 200° C. benzoic acid is formed, and at temperatures as high as 550° C. fair yields may be obtained if the time of contact is sufficiently shortened. To maintain a given percentage conversion the time of contact must be shortened as the temperature is raised.

While my process contemplates the use of various catalytic agents, I prefer to use pure zinc oxide as the catalyst, and while I also prefer to carry out the process at ordinary pressure, it may be advisable in some cases to keep the reaction chamber under moderate pressure, preferably, however, not in excess of seven atmospheres.

Having thus described my invention, what I claim as new and desire to secure by Letters Patent is:

1. A process for producing benzoic acid, characterized by subjecting a mixture of the vapor of phthalic anhydride and water vapor to the action of a catalytic agent.

2. A process for producing benzoic acid, characterized by bringing a mixture of the vapor of phthalic anhydride and water vapor into contact with a catalyst, and subjecting said vaporous mixture to such a temperature as to prevent the precipitation of phthalic acid.

3. A process for producing benzoic acid, which consists in passing a vapor mixture that contains phthalic anhydride and water through a chamber that contains a catalytic agent, and thereafter condensing the products of reaction.

4. A process for producing benzoic acid, characterized by passing a mixture of the vapor of phthalic anhydride and water vapor through a chamber that contains a catalyst, maintaining said mixture in the vapor phase and at a temperature high enough to prevent the precipitation of phthalic acid while it is in said chamber, and thereafter condensing the products of reaction.

5. A process for making benzoic acid, characterized by subjecting a mixture of the vapor of phthalic anhydride and water vapor to the action of zinc oxide while said mixture is maintained at a temperature high enough to prevent the precipitation of phthalic acid.

6. A process for producing benzoic acid, which comprises bringing a mixture of the vapor of phthalic anhydride and water vapor into contact with a catalyst at a temperature which will prevent the precipitation of phthalic acid.

7. A process for producing benzoic acid, which comprises bringing a mixture of the vapor of phthalic anhydride and water vapor into contact with a catalyst at temperatures between 200° C. and 600° C.

8. A process for producing benzoic acid, which comprises bringing a mixture of the vapor of phthalic anhydride and water vapor at temperatures between 200° C. and 600° C. into contact with a catalyst which at 600° C. is infusible, practically non-volatile and stable in steam at ordinary pressures.

9. A process for producing benzoic acid, which comprises bringing a mixture of the vapor of phthalic anhydride and water vapor into contact with a catalyst, and maintaining this mixture in the vapor phase under a pressure of not more than seven atmospheres.

10. A process for producing benzoic acid, which comprises bringing a mixture of one part by weight of the vapor of phthalic anhydride and not less than ten parts by weight of water vapor into contact with a catalyst at temperatures between 200° C. and 600° C.

11. A process for producing benzoic acid, which comprises bringing a mixture of the vapor of phthalic anhydride and water vapor at temperatures between 200° C. and 600° C. into contact with a compound of zinc.

12. A process for producing benzoic acid, which comprises bringing a mixture of the vapor of phthalic anhydride and water vapor at temperatures between 200° C. and 600° C. into contact with zinc oxide.

COURTNEY CONOVER.